United States Patent [19]

Stecher et al.

[11] 4,145,060
[45] Mar. 20, 1979

[54] AXIALLY AND RADIALLY CLAMPING SPREADER RING FOR AN OIL SCRAPING PISTON RING

[75] Inventors: Friedhelm Stecher; Martin Morsbach; Paul Jöhren, all of Burscheid, Fed. Rep. of Germany

[73] Assignee: Goetze AG, Burscheid, Fed. Rep. of Germany

[21] Appl. No.: 751,893

[22] Filed: Dec. 17, 1976

[30] Foreign Application Priority Data

Dec. 20, 1975 [DE] Fed. Rep. of Germany ....... 2557721

[51] Int. Cl.² ............................ F16J 9/20; F16J 15/16
[52] U.S. Cl. .................................... 277/139; 277/200
[58] Field of Search ............... 277/138, 139, 140, 141, 277/142, 200

[56] References Cited

U.S. PATENT DOCUMENTS

| 2,569,778 | 10/1951 | Phillips | 277/200 |
| 2,604,368 | 7/1952 | Norton | 277/200 |
| 2,635,022 | 4/1953 | Shirk | 277/140 |
| 2,671,705 | 3/1954 | Engelhardt | 277/200 |
| 3,353,830 | 11/1967 | Bell | 277/139 |
| 3,622,166 | 11/1971 | Brenneke | 277/138 |
| 3,683,477 | 8/1972 | Sugahara | 277/140 |

*Primary Examiner*—Herbert F. Ross
*Attorney, Agent, or Firm*—Spencer & Kaye

[57] ABSTRACT

An axially and radially clamping spreader ring for an oil scraper piston ring, comprises a profiled metal band which has been made resilient in the circumferential direction by corrugations and/or cuts. The two ends of the metal band abut against one another and the metal band is provided in the area of one side with axial and radial supporting faces to accommodate at least one band-shaped scraper ring. A plurality of radially outwardly extending protrusions are distributed over the circumference of the band in the vicinity of the side of the spreader ring which is axially opposite the side which accommodates the scraper ring. The protrusions are separated from one another by wide lubricating channels and, when installed, contact the cylinder wall.

8 Claims, 8 Drawing Figures

AXIALLY AND RADIALLY CLAMPING SPREADER RING FOR AN OIL SCRAPING PISTON RING

BACKGROUND OF THE INVENTION

The present invention relates to an axially and radially clamping spreader ring for oil scraping piston rings comprising a profiled metal band which has been made resilient in its circumferential direction by means of corrugations and/or cuts, the two ends of which abut against one another, and which has axial and radial supporting faces on one of its sides to accommodate at least one band-shaped scrape ring.

To wipe away or regulate, respectively, the oil supply in internal-combustion engines, oil scraper piston rings are used which are mounted in an annular piston ring groove of a piston and bear against the wall of the cylinder in which the piston is mounted. One well known type of an oil scraper piston ring comprises two axially thin steel band scraper rings and a spreader ring arranged substantially between the two steel band rings. The two steel band scraper rings, also known as parted rails, are axially spaced from each other by the spreader ring, with one of the scraper rings being at the upper side of the spreader ring which is adjacent the combustion chamber and the other scraper ring being at the lower side of the spreader ring which is adjacent the crankshaft. The spreader ring, also known as a spacer-expander, acts to radially press the two scraper rings against the cylinder wall and at the same time to axially press the two scraper rings against the sides of the piston ring groove. Such three-part oil scraper piston rings have the advantage that the two scraper rings can follow the unevennesses of the cylinder wall without mutually influencing one another under the pressure of the spreader ring and are thus able to easily regulate the oil supply of the internal-combustion engine. An example of such a three-part oil scraper piston ring is found in U.S. Pat. No. 2,656,230.

As used herein, the "axial" and "radial" directions are with reference to the axial and radial directions of the piston.

U.S. Pat. No. 2,785,028 discloses a two-part oil scraping piston ring which comprises a spreader ring which clamps axially as well as radially and which further comprises one or two steel band scraper rings which are located only at the upper side of the spreader ring with no steel band scraper rings being provided at the lower side of the spreader ring. The use of one or two steel band scraper rings disposed only on the upper side of the spreader ring adjacent to the combustion chamber to scrape the oil from the cylinder wall has the advantage that the scraped oil can easily be returned to the interior of the piston and thus into the crankshaft chamber through openings in the spreader ring and through bores in the piston. The drawback of such a two-part oil scraping piston ring is the irregular force distribution with respect to the cross section of the spreader ring as a result of the spring forces acting axially and radially on the scraper ring on only the upper side of the spreader ring. The asymmetrical design of the oil scraping system produces a torque acting on the spreader ring. It has been found in practice that the resulting twist in the spreader ring leads to warping within the annular groove of the piston with subsequent jamming of the scraper ring.

U.S. Pat. No. 3,191,947 likewise discloses a two-part oil scraper piston ring which has a spreader ring having a somewhat U-shaped cross section. The open end of the U faces the cylinder wall, the upper leg of the U is adjacent the combustion chamber and supports a steel band scraper ring, and the bottom leg of the U which is on the crankshaft side contacts the cylinder wall with its outer extremeties and acts as an additional oil scraper. This lower leg is comprised of a plurality of short segments which collectively provide a continuous scraper member. With insufficient lubrication and low wear resistance of the spring leg on the crankshaft side, which is made of spring material, as compared to the steel band ring on the combustion chamber side, there occurs malfunction-inviting wear at the friction partners. Moreover, as a result of insufficient lubrication, combustion residues may be deposited which can possibly lead to malfunction of the oil scraper ring.

SUMMARY OF THE INVENTION

It is a primary object of the present invention to improve a spreader ring of the above-mentioned two-part type which has a scraper ring on only one side of the spreader ring so that the drawbacks of the known structures are avoided.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, as embodied and broadly described, the present invention provides an axially and radially clamping spreader ring for an oil scraper piston ring, comprising a profiled metal band which has been made resilient in the circumferential direction by corrugations and/or cuts, its two ends abutting against one another, the metal band being provided in the area of one side with axial and radial supporting faces to accommodate at least one band-shaped scraper ring, and a plurality of radially outwardly extending protrusions distributed over the circumference of the spreader ring in the vicinity of the side of the spreader ring which is axially opposite the side which accommodates the scraper ring, the protrusions being separated from one another by wide lubricating channels, and, when installed in a piston, contact a cylinder wall.

The radial protrusions act as supporting bars which slide with scraping effect on the cylinder wall and absorb the torque resulting from the structural configuration so that the spreader ring can no longer be twisted. On the other hand, the lubricating channels between the radial protrusions are open toward the oil chamber and ard relatively wide in the circumferential direction and, in conjunction with the oil discharge bores in the piston, provide sufficient lubrication and cooling of the ring system.

Preferably, the spreader ring comprises a profiled metal band having a radially inwardly open, approximately U-shaped cross section and contains individual metal band sections which are separated from one another by axial cuts, and the radial protrusions comprise partially stamped out raised portions of each individual metal band section. In one embodiment of the invention, the radial protrusions may comprise, in a particularly simple manner, partially stamped out and radially bent out flaps between the individial metal band sections and the flaps may be bent in an axial direction in order to improve the lubrication and sliding conditions.

According to a further feature of the invention, the radial protrusions may be made to be radially resilient in themselves so that slight unevennesses in the cylinder wall can be eliminated without effect on the actual spreader ring body.

In order to reduce premature wear of the radial protrusions, the protrusion can be provided with tops which are rounded toward the cylinder wall so that the protrusions can easily slide on the oil film on the cylinder wall. In this connection, in order to reduce premature wear, it is also possible to provide the protrusions with a known wear-resistant coating.

Finally, the protrusions may be axially bent in the direction toward the scraper ring and may serve as additional axial supporting elements for the scraper ring in the vicinity of the area contacting the cylinder wall.

In one embodiment of the invention, the spreader ring is made of a metal band with radially meander-shaped corrugations, including a series of radially outwardly extending corrugation peaks, and in such an embodiment it is an advantage if the radial protrusions are provided in the area of the radially outer corrugation peaks at a position disposed axially opposite the scraper ring. The protrusions may thus be shaped in one step together with the cutting and corrugating of the metal band.

In another embodiment of the invention, the spreader ring is made of a metal band having axially extending, meander-shaped corrugations which include a series of lower corrugation peaks, and in this embodiment the radial protrusions are provided at the radially outward portion of each lower corrugation peak.

BRIEF DESCRIPTION OF THE DRAWINGS

The accompanying drawings, in which like numbers indicate like parts, illustrate examples of presently preferred embodiments of the invention and, together with the description, serve to explain the principles of the invention.

Of the drawings:

FIGS. 1a through 4a are partial sectional views of various oil scraper piston rings made in accordance with the teachings of the present invention and shown in the installed state in a piston.

FIGS. 1b to 4b are perspective views of the oil scraper piston rings of FIGS. 1a to 4a.

DESCRIPTION OF PREFERRED EMBODIMENTS

Figure 1A:
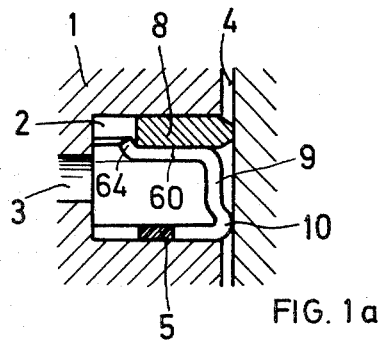

In FIGS. 1a through 4a, reference numeral 1 indicates a piston, reference numeral 2 indicates an annular groove in piston 1 to accommodate the oil scraper piston ring, reference numeral 3 indicates the oil discharge bore in piston 1, and reference numeral 4 indicates the cylinder wall of the cylinder in which piston 1 is mounted.

Figure 1B:
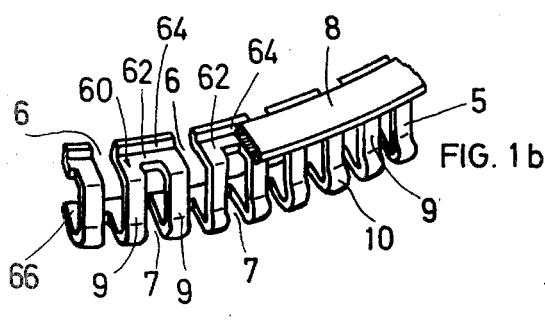

The oil scraper piston ring according to FIGS. 1a and 1b comprises a spreader ring in the form of an approximately U-shaped profiled metal band 5 and a scraper ring 8. Metal band 5 is made resilient in the circumferential direction by overlapping cuts 6 and 7 which alternatingly extend in opposite axial direction and thus form a spreader ring for the simultaneous radial and axial clamping of scraper ring 8.

As shown in FIG. 1a, the open end of the U faces radially inwardly away from cylinder wall 4 and the upper leg, generally 60, of the U forms an axial supporting face for scraper ring 8. In this embodiment of the invention, scraper ring 8 is made of cast iron. Cuts 6 divide leg 60 into a plurality of circumferentially spaced segments 62 and each segment 62 is provided at its radially inward portion with an axially upwardly extending lip 64 which forms a radial supporting face for scraper ring 8. Metal band 5 contains an axially extending base which is divided by cuts 6 and 7 into a plurality of axially extending metal band sections 9 and each segment 62 of leg 60 is connected to two metal band sections 9 at the top of the metal band sections.

Each metal band section 9 has radial protrusions 10 at its lower end adjacent the lower leg 66 of the U shaped metal band. Radial protrusions 10 contact the cylinder wall 4 and are designed as corrugations which can be formed by partially stamping out the band sections 9. Radial protrusions 10 are circumferentially spaced from each other and extend about the entire circumference of metal band 5. Cuts 6 and 7 between metal band sections 9 serve as lubricating channels.

Figure 2A:
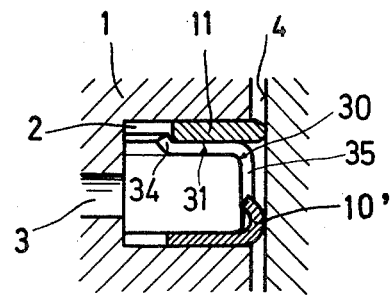
Figure 2B:
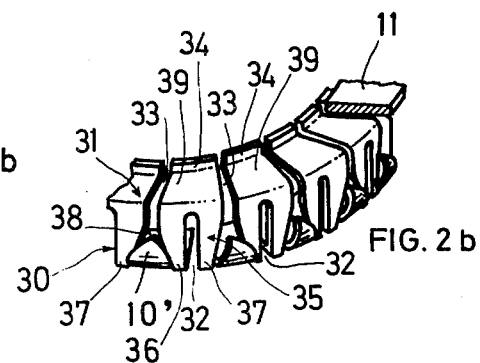

Turning now to FIGS. 2a and 2b, there is shown an oil scraper piston ring comprised of a spreader ring in the form of an approximately U-shaped profiled metal band, generally 30, and a steel band scraper ring 11. As shown in FIG. 2b, the open end of the U faces radially inwardly away from cylinder wall 4 and the upper leg 31 of the U forms an axial supporting face for scraper ring 11. Metal band 30 is made resilient in the circumferential direction by a series of overlapping cuts 32 and 33 which alternatingly extend in opposite axial directions. Cuts 33 divide upper leg 31 into a plurality of circumferentially spaced segments 39 and each segment 39 is provided at its radially inward portion with an axially upwardly extending lip 34 which forms a radial supporting face for scraper ring 11. Metal band 30 contains an axially extending base which is divided by cuts 31 and 32 into a plurality of axially-extending bifurcurated metal band sections, generally 35. Each metal band section 35 is closed at its upper end where it joins a segment 39 of leg 31, and is open at its bottom end as the result of cuts 32 which divide each metal band section 35 into two fingers 36 and 37. Finger 36 of one metal band section is joined to finger 37 of an immediately adjacent metal band section 35 by a segmented portion of lower leg 38 of the U-shaped band 30 which lower leg 38 is segmented by cuts 32. Each segmented portion of lower leg 38 contains a radial outwardly extending protrusion in the form of a cut-out and bent-out, resilient flap 10'. Thus, in the embodiment of FIGS. 2a and b, each radial protrusion is between two adjacent metal band sections 35. Cut 32 in each metal band section 35 serves as a lubricating channel. Resilient flaps 10' are bent axially upwardly and have peaks which are rounded toward and contact cylinder wall 4 when spreader ring 30 is installed. Flaps 10' are radially resilient in themselves so that slight unevenness in cylinder wall 4 can be accommodated without effect in the remaining body of the spreader ring.

Figure 3A:
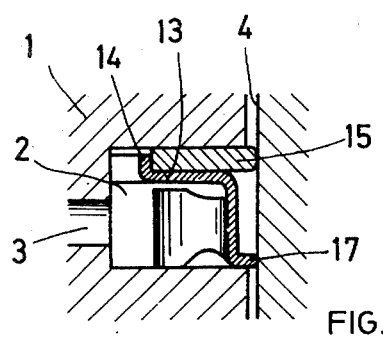
Figure 3B:
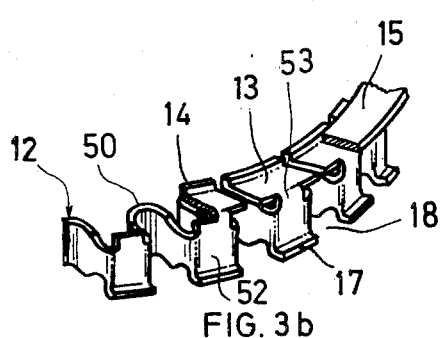

Turning now to FIGS. 3a and 3b, there is shown an oil scraper piston ring comprised of a spreader ring 12 and a steel scraper ring 15. Spreader ring 12 is comprised of a metal band having radially extending meander-shaped corrugations including a series of circumferentially spaced radially inwardly extending corrugation peaks 50 and a series of circumferentially spaced radially outwardly extending corrugation peaks 52. On the upper side of spreader ring 12 which faces the combustion chamber, each radially outwardly extending corrugation peak 52 is provided with a substantially flat and horizontal holding flap 13 to form an axial supporting face for scraper ring 15. Each holding flap 13 is provided with an axially upwardly extending lip 14 at its radially inward portion to form a radial supporting face for scraper ring 15. Holding flaps 13 are joined to corrugation peaks 52 by a cantilever section 53 so that spreader ring 12 is axially compressible. On the lower side of spreader ring 12 which faces the crankshaft chamber, each radially outwardly extending corrugation peak 52 is provided with a radial outwardly extending protrusion in the form of an outwardly angled bar 17 which contacts cylinder wall 4. Bars 17 are separated from each other in the circumferential direction by relatively wide interstices or lubricating channels 18.

Figure 4A:
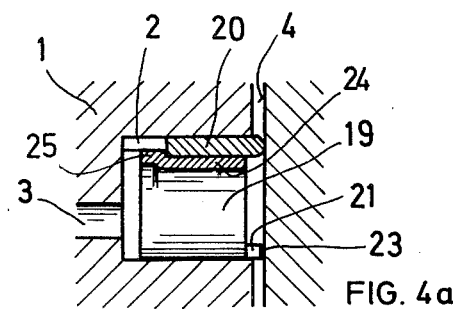
Figure 4B:
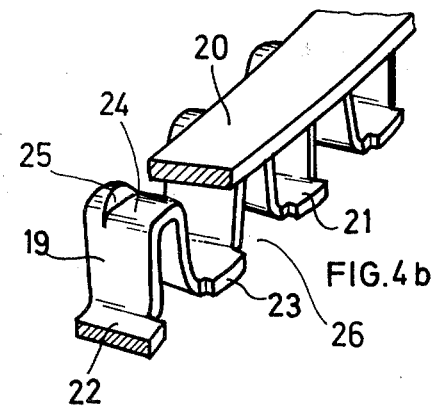

Turning now to FIGS. 4a and 4b, there is shown a spreader ring 19 which is similar to that disclosed in U.S. Pat. No. 2,656,230, and which together with a steel band scraper ring 20, forms an oil scraper piston ring. Spreader ring 19 is comprised of a metal band having axially-extending, meander-shaped corrugations. The corrugations comprise a series of circumferentially spaced lower corrugation peaks 22 and a series of circumferentially spaced upper corrugations peaks 24. Upper corrugation peaks 24 are substantially flat and form an axial supporting face for a band-shaped scraper ring 20. Each upper corrugation peak 24 is provided at its radially inward portion with an axially upwardly extending lip 25 which forms a radial supporting face for scraper ring 20. Each lower corrugation peak 22 is provided at its radially outward portion with radial protrusions 21 in accordance with the teachings of the present invention. Radial protrusions 21 are axially opposite scraper ring 20 and are provided with a wear-resistant sliding surface coating 23, best seen in FIG. 4a. Radial protrusions 21 are separated from each other in the circumferential direction by wide lubricating channels 26.

The spreader rings illustrated in the drawings are of the circumferentially compressible type. When placed in the annular oil groove 2 of a piston 1 within a cylinder, the ends of the spreader ring come into abutting engagement and the entire spreader ring of circular form is circumferentially contracted to a smaller circumference, thereby generating radial forces to push the scraper rings (8, 11, 15 and 20) outwardly to press against the cylinder wall 4. In addition, each of the spreader rings in the drawings generates upwardly directed axial forces against the scraper rings to hold the scraper rings against the upper side of annular oil groove 2. Further, the radial protrusions in each of the spreader rings press against cylinder wall 4.

Example: The inner diameter of the spreader ring is 72.5 mm and the outer diameter is 79.5 mm. The metal band of a thickness of 0.6 mm is U-shaped as shown in FIGS. 1a and 1b so that the axial extension of the spreader ring is 4 mm. The leg 60 is divided into a plurality of circumferentially spaced segments 62 by cuts 6 of a width of 1.3 mm which form together with the cuts 7 of also a width of 1.3 mm axially extending metal band sections 9 of a circumferential extending of 1.25 mm. As described the widths of the cuts 6 and 7 are nearly equal to the circumferential extending of the metal band sections 9. Thus, by motor action, the oil can pass through the radially outward sections of the cuts 7 into the interior of the spreader ring and further through the oil discharge bores 3 into the piston 1. The protrusions 10 may extend radially outward for 0.4 mm in relation to the metal band sections 9.

It will be understood that the above description of the present invention is susceptible to various modifications, changes and adaptations, and the same are intended to be comprehended within the meaning and range of equivalents of the appended claims.

What is claimed is:

1. An axially and radially clamping spreader ring for an oil scraper piston ring, for installation in a groove in a piston which is mounted in a cylinder and which piston has oil discharge bores, comprising a profiled and metal band which has been made resilient in the circumferential direction, its two ends abutting against one another, the metal band being provided in the area of its upper side with axial and radial supporting faces to accommodate at least one band-shaped scraper ring, a plurality of radially outwardly extending protrusions distributed over the circumference of the lower side of the spreader ring, said protrusions being separated from one another by wide lubricating channels, said protrusions acting as supporting bars which slide on the cylinder wall when installed in a piston and absorbing torque resulting from the structural configuration of the spreader ring so that the spreader ring can no longer be twisted, with said lubricating channels, in conjunction with the oil discharge bores in the piston, providing lubrication through the spreader ring and cooling the spreader ring and the scraping ring when installed in a piston, the metal band having an approximately U-shaped cross-sectional profile and containing individual metal band sections which are separated from each other by axial cuts, the radial protrusions comprising partially stamped-out raised and rounded portions of each individual metal band section, said rounded portions being peaks which are rounded toward the cylinder wall.

2. An axially and radially clamping spreader ring for an oil scraper piston ring, for installation in a groove in a piston which is mounted in a cylinder and which piston has oil discharge bores, comprising a profiled and metal band which has been made resilient in the circumferential direction, its two ends abutting against one another, the metal band being provided in the area of its upper side with axial and radial supporting faces to accommodate at least one band-shaped scraper ring, a plurality of radially outwardly extending protrusions distributed over the circumference of the lower side of the spreader ring, said protrusions being separated from one another by wide lubricating channels, said protrusions acting as supporting bars which slide on the cylinder wall when installed in a piston and absorbing torque resulting from the structural configuration of the spreader ring so that the spreader ring can no longer be twisted, with said lubricating channels, in conjunction with the oil discharge bores in the piston, providing lubrication through the spreader ring and cooling the spreader ring and the scraping ring when installed in a piston, the radial protrusions comprising partially cut-out and bent-out axially extending flaps.

3. A spreader ring as defined in claim 2 wherein the radial protrusions themselves are radially resilient.

4. An axially and radially clamping spreader ring for an oil scraper piston ring, for installation in a groove in a piston which is mounted in a cylinder and which piston has oil discharge bores, comprising a profiled metal band which has been made resilient in the circumferential direction, its two ends abutting against one another, the metal band being provided in the area of its upper side with axial and radial supporting faces to accommodate at least one band-shaped scraper ring, a plurality of radially outwardly extending protrusions distributed over the circumference of the lower side of the spreader ring, said protrusions being separated from one another by wide lubricating channels, said protrusions acting as supporting bars which slide on the cylinder wall when installed in a piston and absorbing torque resulting from the structural configuration of the spreader ring so that the spreader ring can no longer be twisted, with said lubricating channels, in conjunction with the oil discharge bores in the piston, providing lubrication through the spreader ring and cooling the spreader ring and the scraping ring when installed in a piston, the metal band being in the form of radially extending meander-shaped corrugations including a series of radially outwardly extending corrugation peaks and the radial protrusions being provided on the radially outwardly extending corrugation peaks.

5. An axially and radially clamping spreader ring for an oil scraper piston ring, for installation in a groove in a piston which is mounted in a cylinder and which piston has oil discharge bores, comprising a profiled and metal band which has been made resilient in the circumferential direction, its two ends abutting against one another, the metal band being provided in the area of its upper side with axial and radial supporting faces to accommodate at least one band-shaped scraper ring, a plurality of radially outwardly extending protrusions distributed over the circumference of the lower side of the spreader ring, said protrusions being separated from one another by wide lubricating channels, said protrusions acting as supporting bars which slide on the cylinder wall when installed in a piston and absorbing torque resulting from the structural configuration of the spreader ring so that the spreader ring can no longer be twisted, with said lubricating channels, in conjunction with the oil discharge bores in the piston, providing lubrication through the spreader ring and cooling the spreader ring and the scraping ring when installed in a piston, the metal band being in the form of axially extending meander-shaped corrugations, and including a series of upper corrugation peaks and a series of lower corrugation peaks, and the radial protrusions being provided in the area of the lower corrugation peaks.

6. An axially and radially clamping spreader ring for an oil scraper piston ring, for installation in a groove in a piston which is mounted in a cylinder and which piston has oil discharge bores, comprising a profiled and metal band which has been made resilient in the circumferential direction, its two ends abutting against one another, the metal band being provided in the area of its upper side with axial and radial supporting faces to accommodate at least one band-shaped scraper ring, a plurality of radially outwardly extending protrusions distributed over the circumference of the lower side of the spreader ring, said protrusions being separated from one another by wide lubricating channels, said protrusions acting as supporting bars which slide on the cylinder wall when installed in a piston and absorbing torque resulting from the structural configuration of the spreader ring so that the spreader ring can no longer be twisted, with said lubricating channels, in conjunction with the oil discharge bores in the piston, providing lubrication through the spreader ring and cooling the spreader ring and the scraping ring when installed in a piston, the metal band having an approximately U-shaped cross-sectional profile and containing individual metal band sections which are separated from each other by axial cuts, and the radial protrusions comprising partially cut-out and bent-out axially extending flaps which are between and alternate with adjacent metal band sections.

7. A spreader ring as defined in claim 6 wherein each individual metal band section is closed at its upper end and is open at its bottom end as the result of an axially extending cut which divides each metal band section into two fingers, said cut serving as a lubricating channel.

8. An axially and radially clamping spreader ring for an oil scraper piston ring, for installation in a groove in a piston which is mounted in a cylinder and which piston has oil discharge bores, comprising a profiled and metal band which has been made resilient in the circumferential direction, its two ends abutting against one another, the metal band being provided in the area of its upper side with axial and radial supporting faces to accommodate at least one band-shaped scraper ring, a plurality of radially outwardly extending protrusions distributed over the circumference of the lower side of the spreader ring, said protrusions being separated from one another by wide lubricating channels, said protrusions acting as supporting bars which slide on the cylinder wall when installed in a piston and absorbing torque resulting from the structural configuration of the spreader ring so that the spreader ring can no longer be twisted, with said lubricating channels, in conjunction with the oil discharge bores in the piston, providing lubrication through the spreader ring and cooling the spreader ring and the scraping ring when installed in a piston, portions of the lubricating channels between the protrusions have a width which is about equal to the circumferential extent of the radial protrusions.

* * * * *